United States Patent
Maucher et al.

(10) Patent No.: US 6,227,978 B1
(45) Date of Patent: May 8, 2001

(54) TRIPODE JOINT WITH ROLLER BEARING

(75) Inventors: Stephen Maucher, Southofen; Jochen Balken, Buchenberg/Allgäu, both of (DE)

(73) Assignee: GKN Automotive AG (DE)

( * ) Notice: Subject to any disclaimer, the term of this patent is extended or adjusted under 35 U.S.C. 154(b) by 0 days.

(21) Appl. No.: 09/274,678

(22) Filed: Mar. 24, 1999

(30) Foreign Application Priority Data

Mar. 25, 1998 (DE) .............................................. 198 13 091

(51) Int. Cl.$^7$ ...................................................... F16D 3/26
(52) U.S. Cl. ........................ 464/111; 464/905; 464/132; 464/128
(58) Field of Search ................................... 464/111, 905, 464/132, 128, 129, 120

(56) References Cited

U.S. PATENT DOCUMENTS

| 3,748,869 | * | 7/1973 | Orain ...................................... 464/132 |
| 5,573,464 | * | 11/1996 | Hofmann et al. ...................... 464/111 |

FOREIGN PATENT DOCUMENTS

| 1 830 662 | 1/1959 | (DE) . |
| 21 57 372 | 6/1972 | (DE) . |
| 41 30 183 C2 | 1/1994 | (DE) . |
| 2600730 | * 12/1987 | (FR) ..................................... 464/111 |
| 56-124325 | 9/1981 | (JP) . |
| 4-296220 | 10/1992 | (JP) . |
| 5321942 | * 12/1993 | (JP) ..................................... 464/111 |

OTHER PUBLICATIONS

PTO 01–0248, Japanese Document No. 04–296220, translation.*

"Gelenke und Gelenkwellen", Springer–Verlag 1988, p. 157.

* cited by examiner

Primary Examiner—Lynne H. Browne
Assistant Examiner—Aaron M Dunwoody

(57) ABSTRACT

A constant velocity tripode joint is disclosed as having an outer joint part with an inner aperture and with uniformly circumferentially distributed recesses which widen the inner aperture and each of which include two opposed tracks. An inner joint part includes a center piece and three uniformly distributed tripode arms arranged radially relative to the center piece and each of which extends into one of the recesses. A roller assembly is mounted on each arm and in rolling contact with the tracks of the respective recess. Each roller assembly comprises at least two rollers that are independently rotatable relative to their respective tripode arm and that are at least indirectly supported on the tripode arm in the radial direction relative to the arm axis. A first roller rolls on the first of the two tracks and is spaced from the other track. A second roller rolls on the other one of the two tracks and is spaced from the first track.

24 Claims, 6 Drawing Sheets

TRIPODE JOINT WITH ROLLER BEARING

BACKGROUND OF THE INVENTION

The invention relates to a constant velocity tripode joint having an outer joint part with an inner aperture and three uniformly circumferentially distributed recesses which widen the inner aperture. Each recess includes two opposed tracks. The tripode joint also has an inner joint part with a center piece having three uniformly circumferentially distributed tripode arms that are arranged radially relative to the center piece and that each extend into one of the recesses. The tripode joint further includes roller assemblies each of which is rotatably supported on one of the tripode arms and that are in rolling contact with the tracks of their respective recesses.

Tripode joints of this type serve to transmit torque between the inner joint part and the outer joint part and are used especially in the drivelines of motor vehicles. When the joint rotates and when the longitudinal axes of the inner joint part and of the outer joint part are articulated relative to one another, the roller assemblies, in their respective recess, periodically move longitudinally to and fro. In tripode joints wherein the roller assemblies are held coaxially on the tripode arms, the roller assemblies carry out periodic angular movements that are superimposed on the longitudinal movements and their angle is twice the size of the angle of articulation between the longitudinal axes. To the extent that the roller assemblies are held angularly movably on the tripode arms, the longitudinal to- and fro- movements take place with the roller axes of the roller assembly extending parallel relative to one another.

During the transmission of torque, the roller assemblies each rest against one of the tracks of the recesses in a coinciding circumferential direction, whereas there necessarily exists a gap between the roller assembly and the other one of the tracks of the respective recess. There exist some restrictive effects because the edges of the second track are alternately contacted by outer annular edges of the roller assemblies. When the tripode joint rotates in a torque-free way, such as is the case when a vehicle changes from operating under load to a pushing operation or when it is operated in a substantially load-free condition, the contact of the roller assemblies changes between the two tracks of each of the recesses. The change in contact is associated with noise generating pulses and the noise adversely affects driving comfort.

It is therefore the object of the present invention to develop a constant velocity tripode joint of the above-mentioned type in such a way that the noise generated by the change in contact of the roller assemblies between the tracks of the recesses during torque-free operation is reduced.

SUMMARY OF THE INVENTION

The objective is achieved by designing each roller assembly to comprise at least two rollers that are independently rotatable relative to their respective tripode arm and that are at least indirectly supported on the tripode arm in the radial direction relative to the axis of the arm. A roller assembly includes a first roller that rolls on the first of the two tracks of its recess and is rotatable with a gap between it and the second track. The roller assembly further includes a second roller that rolls on the second of the two tracks of its recess and is rotatable with a gap between it and the first track.

As a result of the geometric arrangement, a roller assembly can be designed so that it is inserted almost without play between the track contact with the first track and the track contact with the second track, and at the same time, because of the free rotatability of the two rollers relative to one another, rolling movements take place at both tracks, should any contact occur at the same time. Because of the very small amount of designed play, any noise pulse resulting from a change in contact from one track to the other track due to a change in torque is avoided almost completely. The independent rotatability of the two rollers of each roller assembly avoids an increase in the sliding friction percentage at the respective unloaded track because, when contact occurs, the respective roller is able to roll freely in the right sense.

According to a preferred embodiment in each roller assembly, a first roller is supported by a first needle bearing on its respective tripode arm and a second roller is supported by a second needle bearing on the first roller. In such an embodiment, the roller assemblies are held coaxially relative to their respective tripode arm, while they are movable on the first needle bearings in the direction of the arm axis. When the rotating tripode joint is at an angular position, the axial rolling movements of the roller assemblies are superimposed by pivot movements within the recesses, and care has to be taken to ensure that the width of a longitudinal groove in the first track is great enough to accommodate a pivot movement of the second roller within the longitudinal groove without there occurring any edge contacts.

According to a second embodiment in each roller assembly, a first roller is pivotably held on a spherical sleeve that is supported on the tripode arm by a first needle bearing and a second roller is supported on the first roller by a second needle bearing. In this embodiment, the roller assemblies of the tripode joint rotating in an angular position are guided in a form-fitting way within the recesses, with the axes of rotation being held so as to extend parallel relative to one another. The longitudinal groove within the first track can be adapted relatively closely to the width of the second rollers without functioning being adversely affected. The width of the running faces in the recess are increased accordingly.

According to a third embodiment in each roller assembly, a first roller is rotatably supported by a first needle bearing on a sleeve which, in turn, is pivotably guided on a spherical tripode arm and a second roller is supported on the first roller by a second needle bearing. The functioning of such a tripode joint substantially corresponds to the latter tripode joint functioning described above. Instead of a rotatably supported spherical sleeve which is pivotable relative to the first roller, there is provided an intermediate sleeve which is pivotable relative to the tripode arm and on which the first roller is rotatable.

According to a further preferred embodiment, the first roller is composed of two parts that form a central annular groove for a respective second needle bearing and a second roller. This design permits the second needle bearing and the second roller to be assembled without the need for a plurality of securing elements. When using spherical sleeves to achieve pivotability of the roller assemblies on the tripode arms, the spherical sleeves can also be assembled quite easily with the first rollers. According to a further advantageous embodiment the running face of the second roller projects beyond the running face of the first roller and in the respective first tracks there is provided a longitudinal groove to allow the respective second roller contact-free engagement relative to the running face. In each position of contact of the roller assemblies on one of the two tracks of each recess one of the rollers of the roller assembly is loaded substantially symmetrically and it may be advantageous for the size conditions to be such that in a preferred direction of torque transmission the contacting rollers are subjected to a reduced specific load.

Preferably, the running face of the first roller and the running face of the second roller, relative to one another, form concentric spherical surfaces of different diameters. This is a preferred embodiment especially when the roller assemblies are held so as to extend coaxially relative to the axes of the tripode arms. If the roller axes are pivotable relative to the tripode arm axes, different shapes of running faces, especially entirely cylindrical shapes of the first and second rollers can be used.

In a further embodiment each roller assembly includes a pair of first rollers with a second roller between them, the first rollers and second roller are supported either by individual needle bearings directly on their respective tripode arms or on a sleeve which is pivotable on the tripode arm. This embodiment is particularly advantageous and easy to put into effect if the roller assemblies are provided with an intermediate sleeve which is pivotable relative to the tripode arm.

Below, the invention will be explained in greater detail with reference to the embodiments illustrated in the drawings wherein common elements have the same reference numbers.

DETAILED DESCRIPTION OF THE PREFERRED EMBODIMENT

Figure 1:
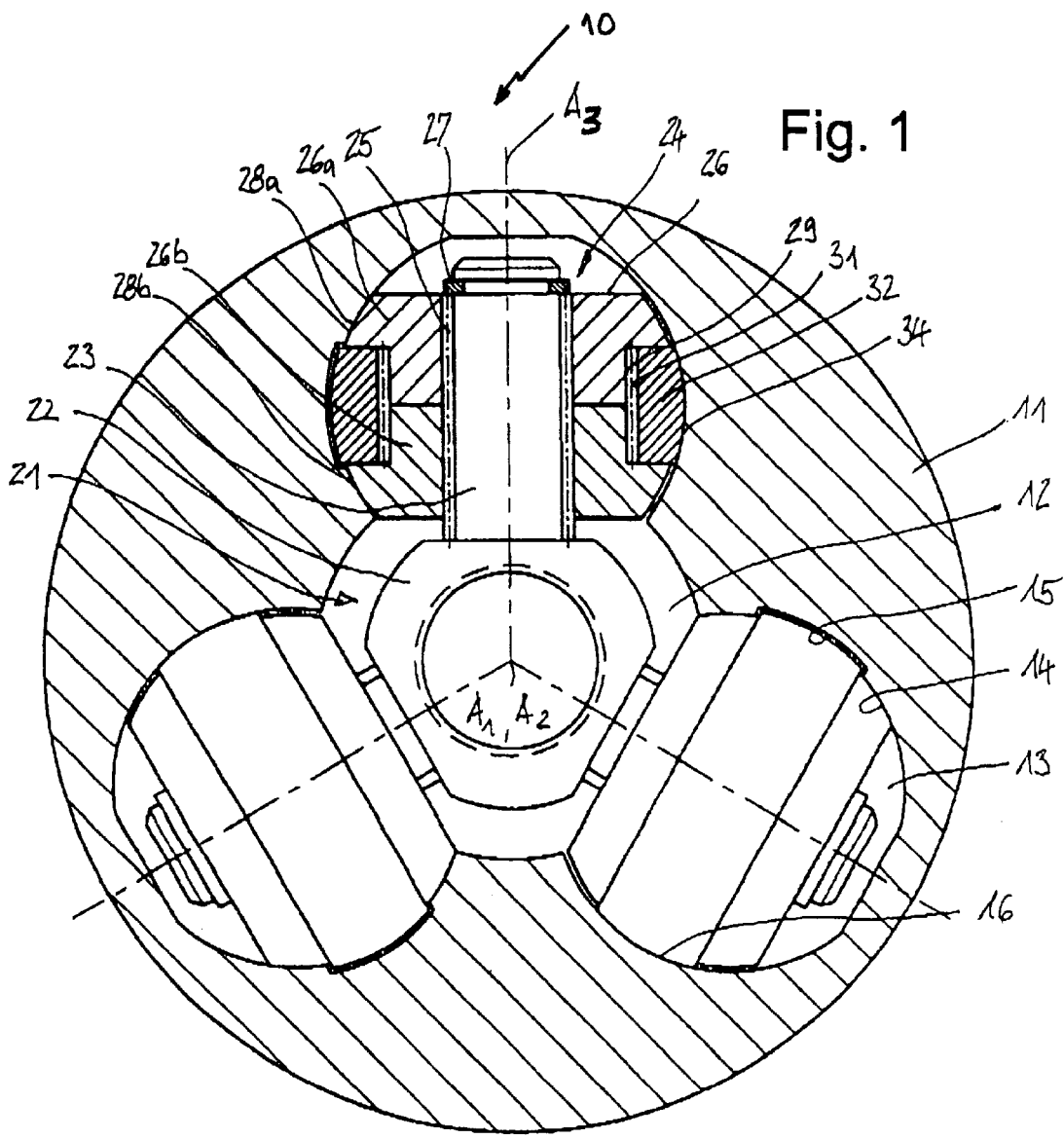
FIG. 1 shows a cross-section of a tripode joint and a roller assembly having rollers that are fixed on their respective tripode arms relative to the axial direction and include a the second roller supported on a first roller.

The tripode joint shown generally at 10 in FIG. 1 comprises an outer joint part 11 with a longitudinal axis $A_1$ and having a central inner aperture 12. Three axially extending recesses 13 widen the central inner aperture 12 and are circumferentially distributed at identical angular distances in the outer joint part 11. Each recess 13 is provided with a first track 14 in which, in the central portion, there is provided a longitudinal groove 15 that is recessed relative to a uniform surface. Each recess 13 includes a second track 16 that is opposite to the first track 14 and which has a uniform surface. The recesses 13 extend in the direction of the longitudinal axis $A_1$ of the outer joint part 11, with a constant cross-section and with the tracks 14 and 16 and the longitudinal groove 15 extending in an axis-parallel way.

The outer joint part 11 receives an inner joint part 21 having a longitudinal axis $A_2$, which coincides with longitudinal axis $A_1$. The inner joint part 21 comprises an approximately annular center piece 22 suitable for receiving a shaft journal (not shown) and three tripode arms 23 each of which extends from the center piece 22 into one of the recesses 13 of the outer joint part 11 approximately in a centered direction. Each arm 23 has an axis $A_3$ radial to $A_1$ and $A_2$. A roller assembly 24, which is in rolling contact with tracks 14 and 16, is rotatably supported on each of the tripode arms 23. One of the roller assemblies 24 will be described below by way of example.

The roller assembly 24 comprises a first roller 26 composed of two substantially symmetric halves 26a and 26b which are connected. The two halves 26a and 26b can be, for example, welded together. The first roller 26 is rotatably supported by a first needle bearing 25 on the tripode arm 23. The needle bearing 25 is secured by a securing ring 27 and the roller 26, as is required for the articulation of the joint, is freely movable along the axis of the tripode arm 23 on the needle bearing 25. The first roller 26 forms a substantially spherical running face, 28a and 28b, which is interrupted by a central annular groove 29. A second roller 32 is supported in the annular groove 29 by a second needle bearing 31 so as to be rotatable relative to the first roller 26 and thus relative to the tripode arm 23, independently of the first roller 26. The second roller 32 has a spherical running face 34 which has a greater radius of curvature than the running face, 28a and 28b, of the first roller 26. The first roller 26 is in rolling contact with the first track 14, whereas the second roller 32 engages the longitudinal groove 15 without contacting the base of the groove 15. Only the second roller 32, by means of its running face 34, is in rolling contact with the second track 16. The running face, 28a and 28b, of the first roller 26 does not extend as far as the running face 34 and is arranged with a gap or play relative to the second track 16. Thus, the first roller 26 is spaced apart from the second track 16 and the second roller 32 is spaced apart from the first track 14.

Figure 2:
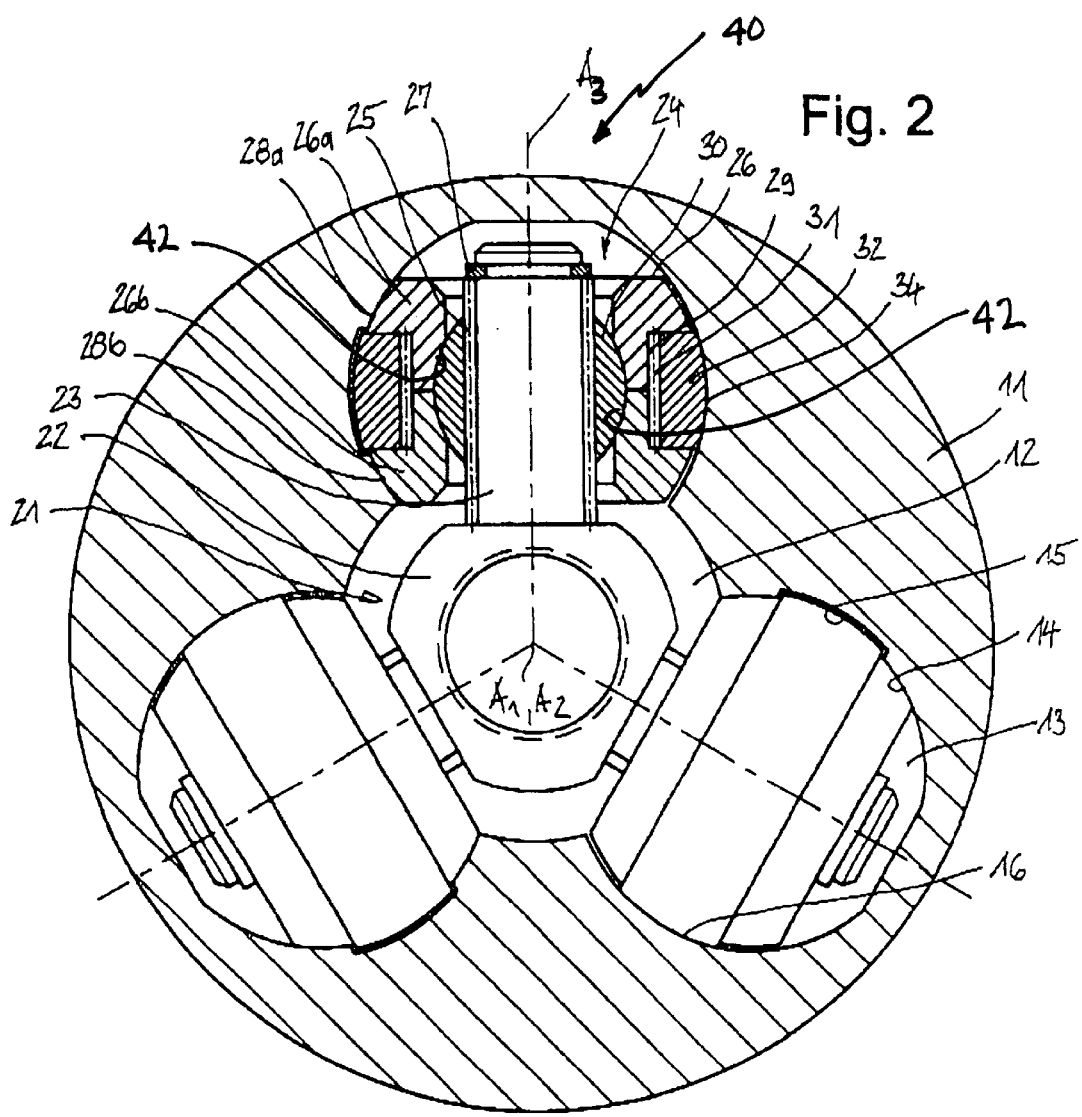
FIG. 2 shows a cross-section of a tripode joint and a roller assembly having rollers that are pivotable relative to the axial direction of their respective tripode arms, with the second rollers being supported on the first rollers.

A second embodiment of a tripode joint is generally shown at 40 in FIG. 2 and comprises outer joint part 11 having longitudinal axis $A_1$ and central inner aperture 12. Three axially extending recesses 13 widen the central inner aperture 12 and are circumferentially distributed at identical angular distances in the outer joint part 11. Each recess 13 includes first track 14 in which, in the central portion, there is a longitudinal groove 15 recessed relative to a uniform surface. Each recess 13 furthermore includes second track 16 opposite first track 14 and having a uniform surface. The recesses 13 extend in the direction of the longitudinal axis $A_1$ of the outer joint part 11 with a constant cross-section and with tracks 14 and 16 and longitudinal groove 15 extending in an axis-parallel way. Outer joint part 11 receives inner joint part 21 having longitudinal axis $A_2$, which coincides with longitudinal axis $A_1$. Inner joint part 21 includes annular center piece 22 and three tripode arms 23, each of which extend from the center piece 22 into one recess 13 of the outer joint part 11 approximately in a centered direction. Each arm 23 has an axis $A_3$. Roller assemblies 24 are in rolling contact with tracks 14, 16 and are rotatably supported on the tripode arms 23. One of the roller assemblies 24 will be described below by way of example.

The roller assembly 24 comprises a first roller 26 composed of two substantially symmetric halves 26a and 26b, which are connected together. The first roller 26 is pivotably arranged on a spherical sleeve 30 by means of an inner annular groove 42. The spherical sleeve 30 is rotatably supported on the arm 23 by needle bearing 25. Needle bearing 25 is secured by securing ring 27. The spherical sleeve 30, as required for the articulation of the joint, is freely movable in the axial direction of the tripode arm 23 on the needle bearing 25. The first roller 26 forms a substantially spherical running face, 28a and 28b, which is interrupted by the central annular groove 29. A second roller 32 is supported in the annular groove 29 by a second needle bearing 31 so as to be rotatable relative to the first roller 26 and thus relative to the tripode arm 23, independently of the first roller 26. The second roller 32 has a spherical running face 34 which has a greater radius of curvature than the running face, 28a and 28b, of the first roller 26. The first roller 26 is in rolling contact with first track 14, whereas the second roller 32 engages longitudinal groove 15 without contacting the base of the same. Only the second roller 32, by means of its running face 34, is in rolling contact with the second track 16, whereas the running face 28 of the first roller 26, which does not extend as far as the running face 34, is arranged with a gap or play relative to the second track 16.

Figure 3:
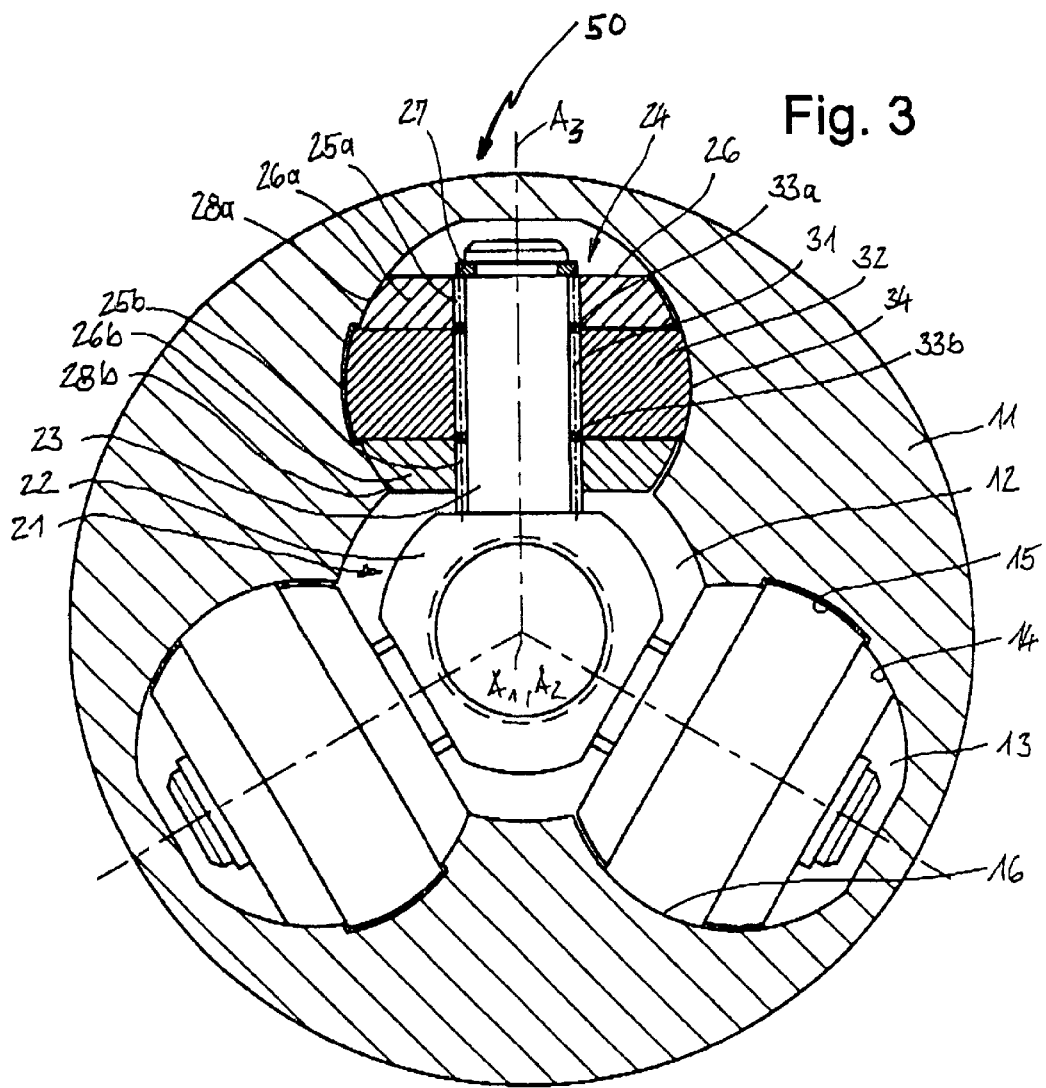
FIG. 3 shows a cross-section of a tripode joint and a roller assembly having rollers that are fixed on their respective tripode arms relative to the axial direction, with the first and the second rollers directly supported on the tripode arms.

A tripode joint shown at 50 in FIG. 3 includes many features described in the description of FIG. 1 and corresponding features are identified by corresponding numerals. The embodiment shown in FIG. 3 differs from FIG. 1 only in the design of the roller assembly 24. One of the roller assemblies 24 will be described below by way of example.

The roller assembly 24 comprises a pair of first rollers 26a and 26b that are designed as two substantially symmetric rollers spaced from each other along axis $A_3$. Roller 26a is rotatably supported by a first needle bearing 25a on the tripode arm 23. Roller 26b is supported by another first needle bearing 25b. The first rollers, 26a and 26b, form a substantially spherical running face, 28a and 28b, which is interrupted by a central gap. A second roller 32 is supported in the gap by a second needle bearing 31 on the tripode arm 23, so as to be rotatable relative to the tripode arm 23, independently of the first rollers 26a and 26b. The second roller 32 has a spherical running face 34 which has a greater radius of curvature than the running faces 28a and 28b of the first rollers 26a and 26b. The first rollers 26a and 26b are in rolling contact with the first track 14, whereas the second roller 32 engages the longitudinal groove 15 without contacting the base of the same. Only the second roller 32, by means of its running face 34, is in rolling contact with the second track 16. The running face 28a and 28b, of the first rollers 26a and 26b, which does not extend as far as the running face 34, is arranged with a gap or play relative to the second track 16.

The needle bearings 25a, 31 and 25b are secured by securing ring 27. Between needle bearings 25a and 31 there is a disc or securing ring 33a. Between needle bearings 31 and 25b there is a disc or securing ring 33b. All rollers 26a, 32, 26b, as is required for the articulation of the joint, are freely movable in the axial direction of the tripode arm 23 on the needle bearings 25a, 31, 25b.

Figure 4:
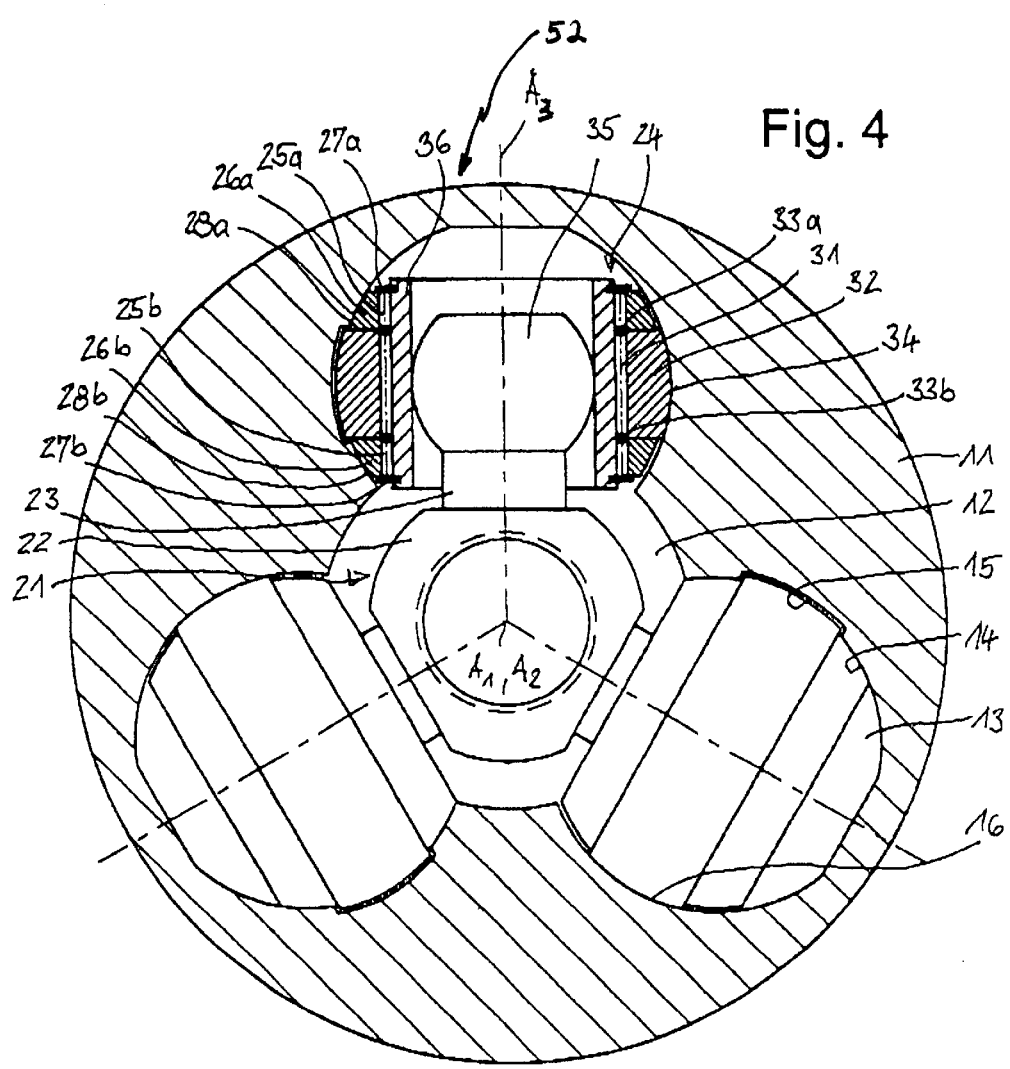
FIG. 4 shows a cross-section of a tripode joint and a roller assembly having rollers that are pivotable relative to the axial direction of their respective tripode arms, with the first and the second rollers supported on a sleeve held on a spherical tripode arm.

A tripode joint shown at 52 in FIG. 4 shares many features described in FIGS. 2 and 3. Corresponding features are designated by corresponding numerals. Each tripode arm 23 comprises a spherical head 35 which pivotably supports a sleeve element 36. The sleeve element 36 holds the roller assembly 24. One of the roller assemblies 24 will be described below by way of example.

The roller assembly 24 comprises a pair of first rollers 26a and 26b that are designed as two substantially symmetric rollers spaced from each other along axis $A_3$. One of the first rollers, 26a, is rotatably supported on the sleeve element 36 by a first needle bearing 25a. The other one of the first rollers, 26b, is supported on sleeve element 36 by another first needle bearing 25b. The first rollers 26a and 26b form substantially spherical running faces 28a and 28b, which are interrupted by a central gap. A second roller 32 is supported in the gap by second needle bearing 31 on the sleeve element 36, so as to be rotatable relative to the sleeve element 36 independently of the first rollers 26a and 26b. The second roller 32 has a spherical running face 34 which has a greater radius of curvature than the running faces 28a and 28b of the first rollers 26a and 26b. The first rollers 26a and 26b are in rolling contact with the first track 14, whereas the second roller 32 engages the longitudinal groove 15 without contacting the base of the same. Only the second roller 32, by means of its running face 34, is in rolling contact with the second track 16 whereas the running face 28a and 28b of the first rollers 26a and 26b, which does not extend as far as the running face 34, is arranged with a gap or play relative to the second track 16.

The needle bearings 25a, 31, and 25b are secured by securing rings 27a and 27b, which are inserted into the outer surface of the sleeve element 36 and which hold the first rollers 26a and 26b and the second roller 32 in between them. Between the needle bearings 25a, 31, and 25b there are provided discs 33a, 33b or further securing rings. The sleeve element 36, as required for the articulation of the joint, is freely movable in the axial direction of the tripode arm 23.

Figure 5:
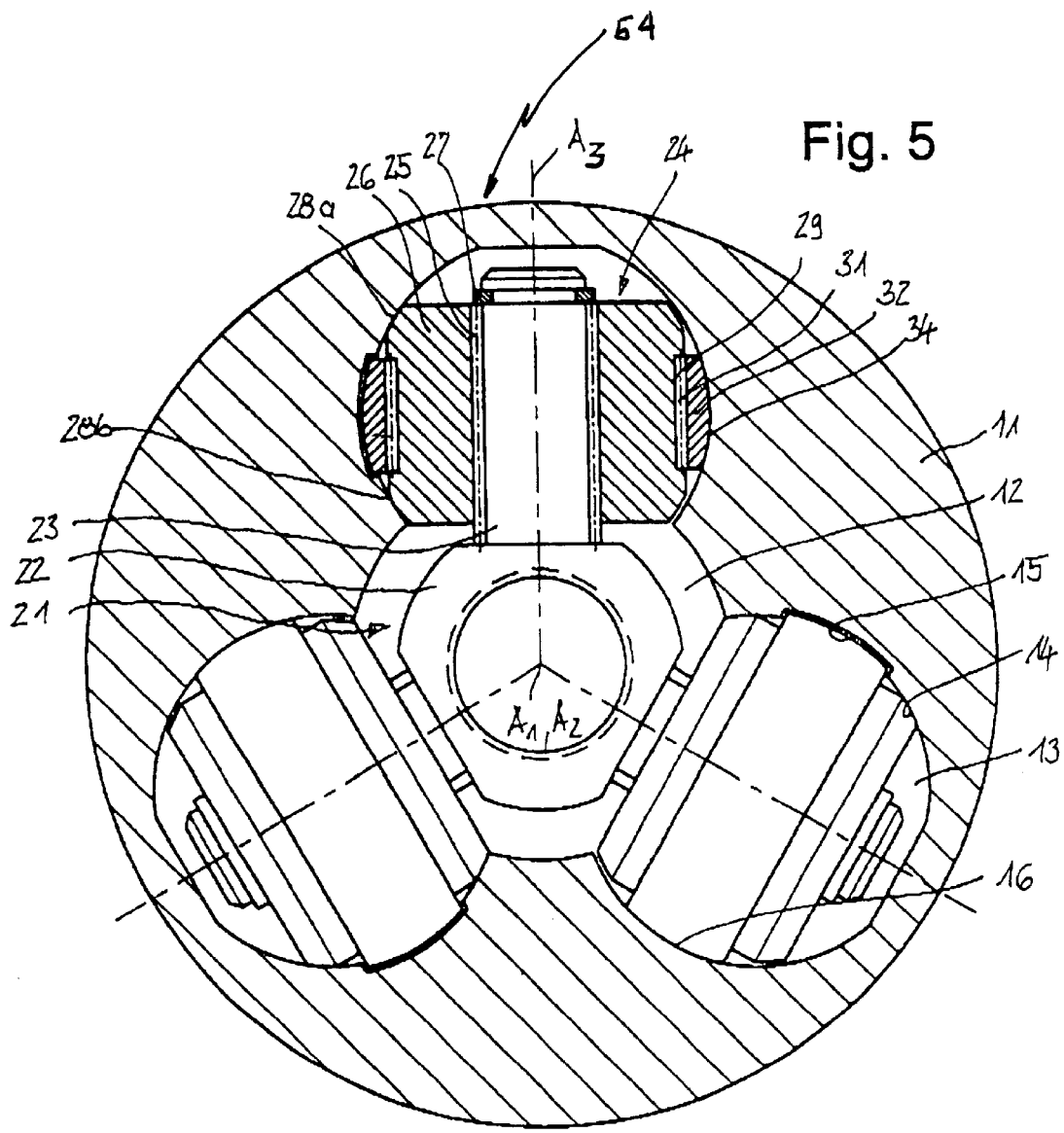
FIG. 5 shows a cross-section of a tripode joint and a roller assembly having rollers that are fixed on their respective tripode arms relative to the axial direction, with the second rollers being supported on one piece first rollers.

A tripode joint shown at 54 in FIG. 5 shares many features described in the description of FIG. 3. Corresponding features are identified by the same numerals. Differences between the joints 50 and 54 are only in the roller assemblies 24. One of the roller assemblies 24 is described below by way of example.

The roller assembly 24 comprises a single, one piece first roller 26. The first roller 26 is rotatably supported by a first needle bearing 25 on the tripode arm 23. The needle bearing 25 is secure by securing ring 27 and the roller 26, as required for the articulation of the joint, is freely movable in the axial direction of the tripode arm 23 on the needle bearing 25. The first roller 26 forms a substantially spherical two-portion running face 28a and 28b that is interrupted by a central annular groove 29. A second roller 32 is supported on the first roller 26 by means of a second needle bearing 31, so as to be rotatable relative to the first roller 26 and thus relative to the tripode arm 23, independently of the first roller 26. The second needle bearing 31 is held in the annular groove 29. The second roller 32 can be axially slid over the second needle bearing 31. The second roller 32 has a spherical running face 34 which has a greater radius of curvature than the running face 28a and 28b of the first roller 26. The first roller 26 is in rolling contact with the first track 14, whereas the second roller 32 engages the longitudinal groove 15 without contacting the base of the same. Only the second roller 32, by means of its running face 34, is in rolling contact with the second track 16, whereas the running face 28a and 28b of the first roller 26, which does not extend as far as the running face 34, is arranged with a gap or play relative to the second track 16.

Figure 6:
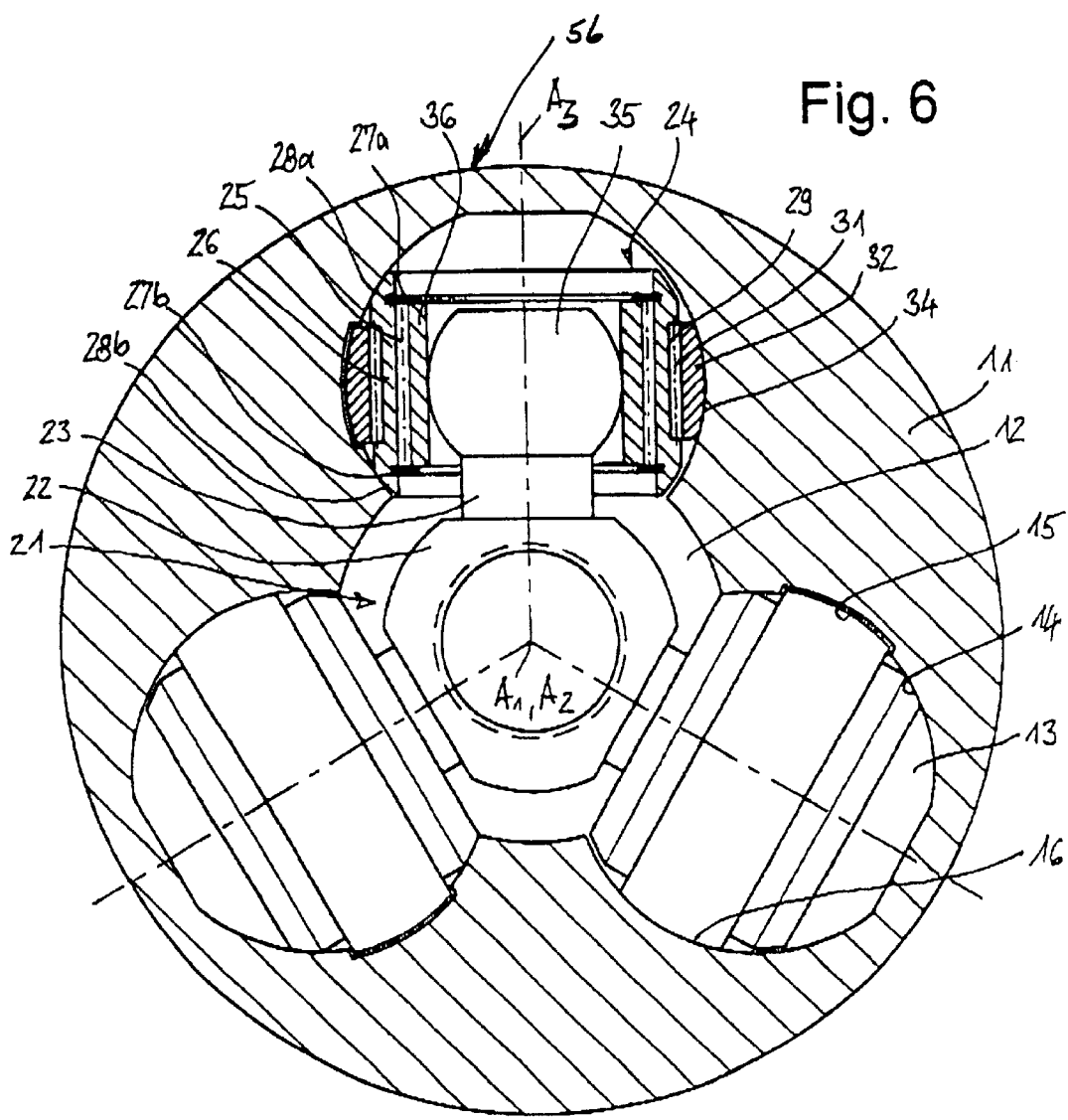
FIG. 6 shows a cross-section of a tripode joint and roller assembly having rollers that are pivotable relative to the axial direction of their respective tripode arms with the second rollers supported on one piece first rollers held on spherical tripode arms.

A tripode joint shown at 56 in FIG. 6 shares many features described in the description of FIG. 4. Corresponding features are identified by the same numerals. The tripode arms 23 comprise spherical heads 35 that pivotably support sleeve elements 36. The sleeve elements 36 hold the roller assemblies 24. One of the roller assemblies 24 will be described below by way of example.

The roller assembly 24 comprises a single one piece first roller 26. The first roller 26 is rotatably supported on the sleeve element 36 by a needle bearing 25. The first roller 26 forms a substantially spherical two-portion running face 28a and 28b which is interrupted by a central gap. In the gap there is a central annular groove 29. A second roller 32 is supported in the gap by second needle bearing 31 held in the groove 29, so as to be rotatable relative to the first roller 26 and thus relative to the sleeve element 36 independently of the first roller 26. The second roller 32 has a spherical running face 34 that has a greater radius of curvature than the running face 28a and 26b of the first roller 26. The first roller 26 is in rolling contact with the first track 14, whereas the second roller 32 engages the longitudinal groove 15 without contacting the base of the same. Only the second roller 32, by means of it running face 34 is in rolling contact with the second track 16, whereas the running face 28a, 28b of the first roller 26, which does not extend as far as the running face 34, is arranged with play relative to the second track 16. The needle bearing 25 is secured by securing rings 27a, 27b, which are inserted into the outer surface of the sleeve element 36 and hold the first roller 26 axially fixed. The sleeve element 36, as required for the articulation of the joint, is freely movable in the axial direction of the tripode arm 23.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A constant velocity tripode joint comprising:
   an outer joint part with an inner aperture and a plurality of uniformly circumferentially distributed recesses that widen said inner aperture and that each include two opposed tracks;
   an inner joint part with a center piece and a plurality of uniformly circumferentially distributed tripode arms arranged radially relative to said center piece and each of which extends into one of said recesses;
   a roller assembly is rotatably supported on each of said tripode arms and in rolling contact with said opposed tracks of a respective recess, each roller assembly comprising at least two rollers that are independently rotatable relative to their respective tripode arm and that are at least indirectly supported on said tripode arm in a radial direction relative to the axis of said arm;
   at least a first of said rollers rolling on a first of said opposed tracks and spaced from a second of said opposed tracks;
   at least a second of said rollers rolling on said second of said opposed tracks and spaced from said first of said opposed tracks; and
   said first roller rotatably supported on its respective tripode arm and said second roller rotatably supported on said first roller.

2. A tripode joint according to claim 1, wherein each of said first rollers is supported by a first needle bearing on its respective tripode arm.

3. A tripode joint according to claim 1 wherein, each of said second rollers is supported by a second needle bearing on its respective first roller.

4. A tripode joint according to claim 3 wherein, each of said first rollers is composed of two parts that form a central annular groove, said groove receiving said second needle bearing and said second roller.

5. A constant velocity tripode joint comprising:
   an outer joint part with an inner aperture and a plurality of uniformly circumferentially distributed recesses that widen said inner aperture and that each include two opposed tracks;
   an inner joint part with a center piece and a plurality of uniformly circumferentially distributed tripode arms arranged radially relative to said center piece and each of which extends into one of said recesses;
   a roller assembly is rotatably supported on each of said tripode arms and in rolling contact with said opposed tracks of a respective recess, each roller assembly comprising at least two rollers that are independently rotatable relative to their respective tripode arm and that are at least indirectly supported on said tripode arm in a radial direction relative to the axis of said arm;
   at least a first of said rollers rolling on a first of said opposed tracks and spaced from a second of said opposed tracks;
   at least a second of said rollers rolling on said second of said opposed tracks and spaced from said first of said opposed tracks;
   said first roller rotatably supported on its respective tripode arm and said second roller rotatably supported on said first roller; and
   wherein, said second rollers each include a running face that projects beyond a running face of said first roller and said first of said opposed tracks having a longitudinal groove to allow said second roller contact-free engagement relative to said running face of said second roller.

6. A tripode joint according to claim 5 wherein, said running face of said first roller and said running face of said second roller, relative to one another, form concentric spherical surfaces of different diameters.

7. A tripode joint comprising:
   an outer joint part with an inner aperture and a plurality of uniformly circumferentially distributed recesses that widen said inner aperture and that each include two opposed tracks;
   an inner joint part with a center piece and a plurality of uniformly circumferentially distributed tripode arms arranged radially relative to said center piece and each of which extends into one of said recesses;
   a roller assembly is rotatably supported on each of said tripode arms and in rolling contact with said opposed tracks of a respective recess, each roller assembly comprising at least two rollers that are independently rotatable relative to their respective tripode arm and that are at least indirectly supported on said tripode arm in a radial direction relative to the axis of said arm;
   at least a first of said rollers rolling on a first of said opposed tracks and spaced from a second of said opposed tracks;
   at least a second of said rollers rolling on said second of said opposed tracks and spaced from said first of said opposed tracks; and
   in each of said roller assemblies, said first roller being pivotably held on a spherical sleeve that is rotatably supported on said tripode arm and said second roller is supported on said first roller.

8. A tripode joint according to claim 7 wherein, said first roller is supported by a first needle bearing on its respective tripode arm.

9. A tripode joint according to claim 7 wherein, said second roller is supported by a second needle bearing on its respective first roller.

10. A tripode joint according to claim 9 wherein, each of said first rollers is composed of two parts that form a central annular groove, said groove receiving said second needle bearing and said second roller.

11. A tripode joint comprising:
an outer joint part with an inner aperture and a plurality of uniformly circumferentially distributed recesses that widen said inner aperture and that each include two opposed tracks;
an inner joint part with a center piece and a plurality of uniformly circumferently distributed tripode arms arranged radially relative to said center piece and each of which extends into one of said recesses;
a roller assembly is rotatably supported on each of said tripode arms and in rolling contact with said opposed tracks of a respective recess, each roller assembly comprising at least two rollers that are independently rotatable relative to their respective tripode arm and that are at least indirectly supported on said tripode arm in a radial direction relative to the axis of said arm;
at least a first of said rollers rolling on a first of said opposed tracks and spaced from a second of said opposed tracks;
at least a first of said rollers rolling on said second of said opposed tracks and spaced from said first of said opposed tracks;
in each of said roller assemblies, said first roller being pivotably held on a spherical sleeve that is rotatably supported on said tripode arm and said second roller is supported on said first roller; and
wherein, said second rollers each include a running face that projects beyond a running face of said first roller and said first of said opposed tracks having a longitudinal groove to allow said second roller contact-free engagement relative to said running face of said second roller.

12. A tripode joint according to claim 11 wherein, said running face of said first roller and said running face of said second roller, relative to one another, form concentric spherical surfaces of different diameters.

13. A tripode joint comprising:
an outer joint part having an inner aperture and a plurality of uniformly circumferentially distributed recesses that widen said inner aperture and that each include two opposed tracks;
an inner joint part with a center piece and a plurality of circumferentially distributed tripode arms arranged radially relative to said center piece and each of which extends into one of said recesses;
a roller assembly rotatably supported on each of said tripode arms and in rolling contact with said opposed tracks of a respective recess, each roller assembly comprising at least two rollers that are independently rotatable relative to their respective tripode arm and that are at least indirectly supported on said tripode arm in a radial direction relative to the axis of said arm;
at least a first of said rollers rolling on a first of said opposed tracks and spaced from a second of said opposed tracks;
at least a second of said rollers rolling on said second of said opposed tracks and spaced from said first of said opposed tracks; and
in each of said roller assemblies, said first roller being rotatably supported on a sleeve element that is pivotably guided on a spherical head of said tripode arm, and said second roller is supported on said first roller.

14. A tripode joint according to claim 13 wherein, said first roller is supported by a first needle bearing on its respective sleeve element.

15. A tripode joint according to claim 13 wherein, said second roller is supported by a second needle bearing on its respective first roller.

16. A tripode joint according to claim 15 wherein, each of said first rollers is composed of two parts that form a central annular groove, said groove receiving said second needle bearing and said second roller.

17. A tripode joint according to claim 13 wherein, said second rollers each include a running face that projects beyond a running face of said first roller and said first of said opposed tracks having a longitudinal groove to allow said second roller contact-free engagement relative to said running face of said second roller.

18. A tripode joint according to claim 17 wherein, said running face of said first roller and said running face of said second roller, relative to one another, form concentric spherical surfaces of different diameters.

19. A tripode joint comprising:
an outer joint part having an inner aperture and a plurality of uniformly circumferentially distributed recesses that widen said inner aperture and that each include two opposed tracks;
an inner joint part with a center piece and a plurality of uniformly circumferentially distributed tripode arms that are arranged radially relative to said center piece and each of which extend into one of said recesses;
a roller assembly is rotatably supported on each of said tripode arms and in rolling contact with said opposed tracks of a respective recess, each roller assembly comprising at least two rollers that are independently rotatable relative to their respective tripode arm and that are at least indirectly supported on said tripode arm in a radial direction relative to the axis of said arm;
at least a first of said rollers rolling on a first of said opposed tracks and spaced from a second of said opposed tracks;
a second of said rollers rolling on said second of said opposed tracks and spaced from said first of said opposed tracks; and
in each of said roller assemblies said first of said rollers comprises a pair of first rollers, and said second roller is positioned between said pair of first rollers.

20. A tripode joint according to claim 19 wherein, said pair of first rollers and said second rollers are supported by individual needle bearings directly on their respective tripode arm.

21. A tripode joint according to claim 19 wherein, said pair of first rollers and said second rollers are supported on a sleeve, said sleeve pivotable on a spherical head of a respective tripode arm.

22. A tripode joint according to claim 21 wherein, said pair of first rollers and said second rollers are each supported by needle bearings directly on said sleeve.

23. A tripode joint according to claim 19 wherein, said second rollers each include a running face that projects beyond a running face of said first roller and said first of said opposed tracks having a longitudinal groove to allow said second roller contact-free engagement relative to said running face of said second roller.

24. A tripode joint according to claim 23 wherein, said running face of said first roller and said running face of said second roller, relative to one another, form concentric spherical surfaces of different diameters.

* * * * *